(12) United States Patent
Funatsu et al.

(10) Patent No.: US 10,181,636 B2
(45) Date of Patent: Jan. 15, 2019

(54) ANTENNA SYSTEM

(71) Applicant: ASAHI GLASS COMPANY, LIMITED, Tokyo (JP)

(72) Inventors: Toshifumi Funatsu, Tokyo (JP); Fumitaka Terashima, Tokyo (JP)

(73) Assignee: AGC INC., Tokyo (JP)

( * ) Notice: Subject to any disclaimer, the term of this patent is extended or adjusted under 35 U.S.C. 154(b) by 21 days.

(21) Appl. No.: 14/969,304

(22) Filed: Dec. 15, 2015

(65) Prior Publication Data

US 2016/0099494 A1   Apr. 7, 2016

Related U.S. Application Data

(63) Continuation of application No. PCT/JP2014/070201, filed on Jul. 31, 2014.

(30) Foreign Application Priority Data

Aug. 2, 2013 (JP) ................................. 2013-161315

(51) Int. Cl.
  *H01Q 21/29* (2006.01)
  *H01Q 1/12* (2006.01)
  *H01Q 9/42* (2006.01)
  *H01Q 1/52* (2006.01)
  *H01Q 1/32* (2006.01)
  *H04B 1/12* (2006.01)

(52) U.S. Cl.
  CPC .......... *H01Q 1/1271* (2013.01); *H01Q 1/325* (2013.01); *H01Q 1/521* (2013.01); *H01Q 9/42* (2013.01); *H01Q 21/29* (2013.01); *H04B 1/126* (2013.01)

(58) Field of Classification Search
  CPC ...... H01Q 1/1271; H01Q 1/325; H01Q 21/29; H01Q 1/521; H01Q 9/42
  USPC .......................................... 343/713; 381/71.4
  See application file for complete search history.

(56) References Cited

U.S. PATENT DOCUMENTS 4,823,142 A * 4/1989 Ohe .................... H01Q 1/1271
                                                   343/713
5,430,894 A * 7/1995 Nohara .................. H03G 9/005
                                                   375/346

(Continued)

FOREIGN PATENT DOCUMENTS

JP           06-247746 A    9/1994
JP           07-007209 U    1/1995

(Continued)

OTHER PUBLICATIONS

International Search Report, PCT/JP2014/070201, dated Oct. 28, 2014, 2 pages.

*Primary Examiner* — Hai V Tran
(74) *Attorney, Agent, or Firm* — Foley & Lardner LLP; Michael D. Kaminski (57) ABSTRACT

Disclosed is an antenna system including a glass antenna that is disposed in window glass that is installed in a window opening that is formed in a metal body of a vehicle, wherein the glass antenna is to receive a radio wave in a MF band or in a LF band; an in-vehicle antenna that is disposed at an inner side of the vehicle compared to the metal body of the vehicle, wherein the in-vehicle antenna is positioned in a vicinity of the glass antenna; and a canceler to cancel a noise signal of the in-vehicle antenna in a received signal of the glass antenna.

13 Claims, 10 Drawing Sheets

(56) References Cited

U.S. PATENT DOCUMENTS

| | | | | |
|---|---|---|---|---|
| 6,072,435 A * | 6/2000 | Terashima | ........... | H01Q 1/1271 |
| | | | | 343/704 |
| 6,870,509 B2 * | 3/2005 | Ooe | .................... | H01Q 1/1271 |
| | | | | 343/711 |
| 7,289,075 B2 * | 10/2007 | Kagaya | .................... | H01Q 1/12 |
| | | | | 343/741 |
| 8,103,235 B2 * | 1/2012 | Shiotsu | ................. | H04B 1/126 |
| | | | | 455/226.3 |
| 2009/0197558 A1 | 8/2009 | Shiotsu et al. | | |
| 2009/0233555 A1 | 9/2009 | Nakamura | | |
| 2010/0156730 A1 * | 6/2010 | Yamamoto | ........... | H01Q 1/1271 |
| | | | | 343/713 |
| 2010/0164816 A1 * | 7/2010 | Kuribayashi | ............ | H01Q 7/00 |
| | | | | 343/713 |
| 2013/0010977 A1 * | 1/2013 | Hirano | ................ | H04B 15/005 |
| | | | | 381/71.4 |

FOREIGN PATENT DOCUMENTS

| | | |
|---|---|---|
| JP | 09-331377 A | 12/1997 |
| JP | 2005-101916 A | 4/2005 |
| JP | 2006-295797 A | 10/2006 |
| JP | 2013-168744 A | 8/2013 |

* cited by examiner

ANTENNA SYSTEM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2014/070201 filed on Jul. 31, 2014 and designating the U.S., which claims priority of Japanese Patent Application No. 2013-161315 filed on Aug. 2, 2013. The entire contents of the foregoing applications are incorporated herein by reference.

BACKGROUND OF THE INVENTION

1. Field of the Invention

The present invention relates to an antenna system that can be installed in a vehicle, such as an automobile.

2. Description of the Related Art

As a countermeasure technique against reception disturbance that can be caused by noise that is emitted from a noise source in a vehicle, Patent Document 1 (Japanese Unexamined Patent Publication No. 2006-295797) has been known, for example. Patent Document 1 discloses a technique against the reception disturbance of a television broadcast signal in a VHF band or in a UHF band.

Whereas, in so called a "hybrid vehicle" that combines an engine and a motor, or in an electric vehicle, electronic devices are installed, such as a motor and an inverter. The noise that is emitted from such an electronic device may affect a radio wave in a Medium Frequency (MF) band or in a Low Frequency (LF) band, so that receiving performance of an antenna for receiving a radio wave in the MF band or the LF band may be lowered.

In the technique of Patent Document 1, however, two antenna elements are required to be disposed, so that a difference between respective differences from a noise source to the two antenna elements is equal to a half wavelength of the noise. Thus, it is required to identify a noise source, and a situation may not be handled where there are multiple noise sources. Furthermore, a wavelength of a radio wave in the MF band or the LF band is significantly greater than that of a radio wave in the VHF band or the UHF band. Consequently, for a case of using it as a countermeasure against the reception disturbance of a radio wave in the MF band or the LF band, one of the antenna elements may not be disposed in the vehicle because it may be necessary to dispose the antenna elements so that they are greatly separated from each other. Hence, the reception disturbance in the MF band or in the LF band may not be handled with the technique of Patent Document 1.

Accordingly, there is a need for an antenna system that can suppress degradation of the reception performance of receiving a radio wave in the MF band or in the LF band, due to noise that is emitted from inside the vehicle.

SUMMARY OF THE INVENTION

According to an aspect of the present invention, there is provided an antenna system including a glass antenna that is disposed in window glass that is installed in a window opening that is formed in a metal body of a vehicle, wherein the glass antenna is to receive a radio wave in a MF band or in a LF band; an in-vehicle antenna that is disposed at an inner side of the vehicle compared to the metal body of the vehicle, wherein the in-vehicle antenna is positioned in a vicinity of the glass antenna; and a canceler to cancel a noise signal of the in-vehicle antenna in a received signal of the glass antenna.

According to an aspect of the present invention, degradation of receiving performance for receiving a radio wave in the MF band or in the LF band, due to noise that is emitted from inside the vehicle, can be suppressed.

Other objects, features and advantages of the present invention will become more apparent from the following detailed description when read in conjunction with the accompanying drawings.

DESCRIPTION OF THE PREFERRED EMBODIMENTS

An embodiment for implementing the present invention is described below by referring to the drawings. Note that, in the drawings for describing the embodiment, it is assumed that a direction refers to a direction on the drawings, except as specifically described otherwise, and a reference direction of each of the drawings corresponds to a direction of a symbol and/or a number. Additionally, a direction, such as parallel and a right angle, can be such that a shift may be allowed to the extent that the effect of the present invention is not damaged. Furthermore, as window glass to which the present invention can be applied, rear glass that can be installed at a rear part of a vehicle, a windshield that can be installed at a front part of a vehicle, side glass that can be installed at a side part of a vehicle, and roof glass that can be installed at a ceiling part of a vehicle can be considered, for example.

Figure 1:
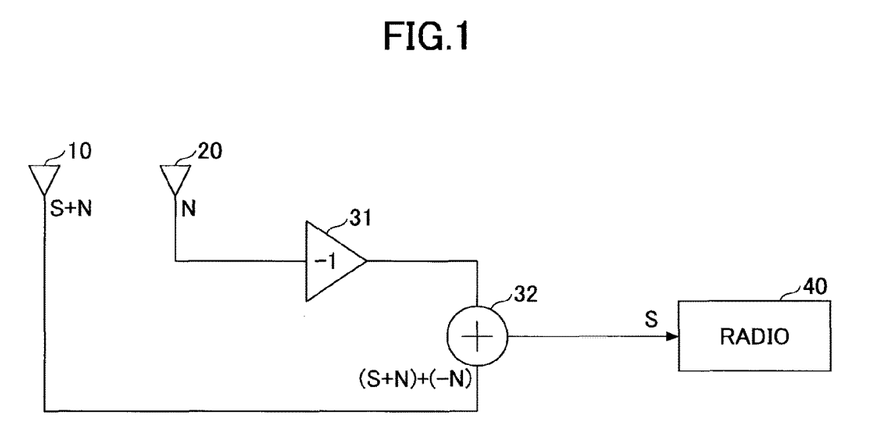
FIG. 1 is a diagram illustrating an example of a canceler.

FIG. 1 is a diagram illustrating an example of a canceler for cancelling a received signal of an in-vehicle antenna 20, which is disposed at an inner side of a vehicle, in a received signal of a glass antenna 10, which is disposed on window glass. The glass antenna 10 is installed on window glass, which is installed in a window opening that is formed in a metal body of the vehicle, and the glass antenna 10 can be formed so that a radio wave in a MF band (from 300 kHz to 3 MHz) or in a LF band (from 30 kHz to 300 kHz) can be received. The in-vehicle antenna 20 is disposed at an inner side of the vehicle compared to the metal body of the vehicle, and the in-vehicle antenna 20 is positioned in the vicinity of the glass antenna 10. In FIG. 1, as a canceler for cancelling a noise signal of the in-vehicle antenna 20 in the received signal of the glass antenna 10, a phase inverter 31 and an adder 32 are exemplified.

The glass antenna 10 can receive both noise N that is generated from a noise source in the vehicle and a radio wave (signal) S for broadcasting and/or radio communication that comes from outside the vehicle at voltages that are greater than or equal to a predetermined received voltage because the glass antenna 10 is disposed on the window glass, which is installed in the window opening that is formed in the vehicle. Each of the noise N and the radio wave S has a frequency in the MF band or in the LF band. The noise source that emits the noise N may be, for example, an electronic device that is installed in the vehicle, such as an inverter. A specific example of the radio wave S can be an AM broadcast wave that has a frequency that is included in the MF band (e.g., a frequency within a frequency band from 520 kHz to 1700 kHz). Whereas, the in-vehicle antenna 20 may not receive the radio wave S that comes from outside the vehicle, and the in-vehicle antenna 20 may only receive the noise N in the vehicle because the in-vehicle antenna 20 is disposed at the inner side of the vehicle compared to the metal body of the vehicle.

The reason is explained below. If it were not for the window opening in the vehicle, a space inside the vehicle that is surrounded by the metal body would be in a state such that the space is shielded against the radio wave S that comes from outside the vehicle. Conversely, the noise N that is generated in the vehicle would not be emitted outside the vehicle. If the window opening is formed in the metal body of the vehicle and the window glass is installed, the portion allows the radio wave to pass through because the window glass is an isolator.

Note that a wavelength of the radio wave S is significantly greater than a width of the window opening (typically, from 1.0 m to 1.5 m). For example, a wavelength of a radio wave of 520 kHz is 576 m, a wavelength of a radio wave of 1000 kHz is 300 m, and a wavelength of a radio wave of 1630 kHz is 184 m. Thus, the radio wave S that comes from outside the vehicle can be greatly attenuated (e.g., from 30 dB to 40 dB), after passing through the window opening that is formed in the vehicle and reaching inside the vehicle. Consequently, the in-vehicle antenna 20, which is capable of receiving a radio wave in the MF band or in the LF band, may not receive the radio wave S, and the in-vehicle antenna 20 may only receive, at a voltage that is greater than or equal to a predetermined received voltage, the noise N (i.e., the noise having a frequency in the MF band or in the LF band) that is generated inside the vehicle.

The glass antenna 10 is provided on a plane surface of the window glass in a state in which the window glass is separated from a plane surface that is formed by the window opening by an amount of height of an adhesive material, and the glass antenna 10 is positioned at a distance that is less than 10 mm from the window opening. At that position, the glass antenna 10 may receive both the noise N and the radio wave S because the noise N from inside the vehicle is not so greatly attenuated.

Thus, the canceler that is shown in FIG. 1 inverts one of the received signal (S+N) that is received by the glass antenna 10 and the noise signal (N) that is received by the in-vehicle antenna 20, and combines the inverted signal and the other signal by adding these signals. FIG. 1 exemplifies a situation in which a phase of the noise signal (N) that is received by the in-vehicle antenna 20 is inverted by a phase inverter 31, and the noise signal (−N) that is output from the phase inverter 31 and the received signal (S+N) that is received by the glass antenna 10 are added by an adder 32.

By such a canceler, the noise N can be removed from the received signal (S+N) that is received by the glass antenna 10, and only a received signal that corresponds to the radio wave S can be extracted from the received signal (S+N). Then, the adder 32 can supply the extracted signal to a tuner that is included in a radio 40 that is installed in the vehicle. In this manner, degradation of receiving performance for receiving a radio wave in the MF band or in the LF band, due to the noise N, can be suppressed because the received signal from which the noise N is removed can be supplied to the tuner.

In addition, by using the glass antenna, a rooftop antenna that may be installed on a roof of the vehicle can be eliminated. Thus, as a consequence that a protrusion that protrudes from the roof of the vehicle is eliminated, air resistance can be reduced, and appearance can be enhanced.

Figure 2:
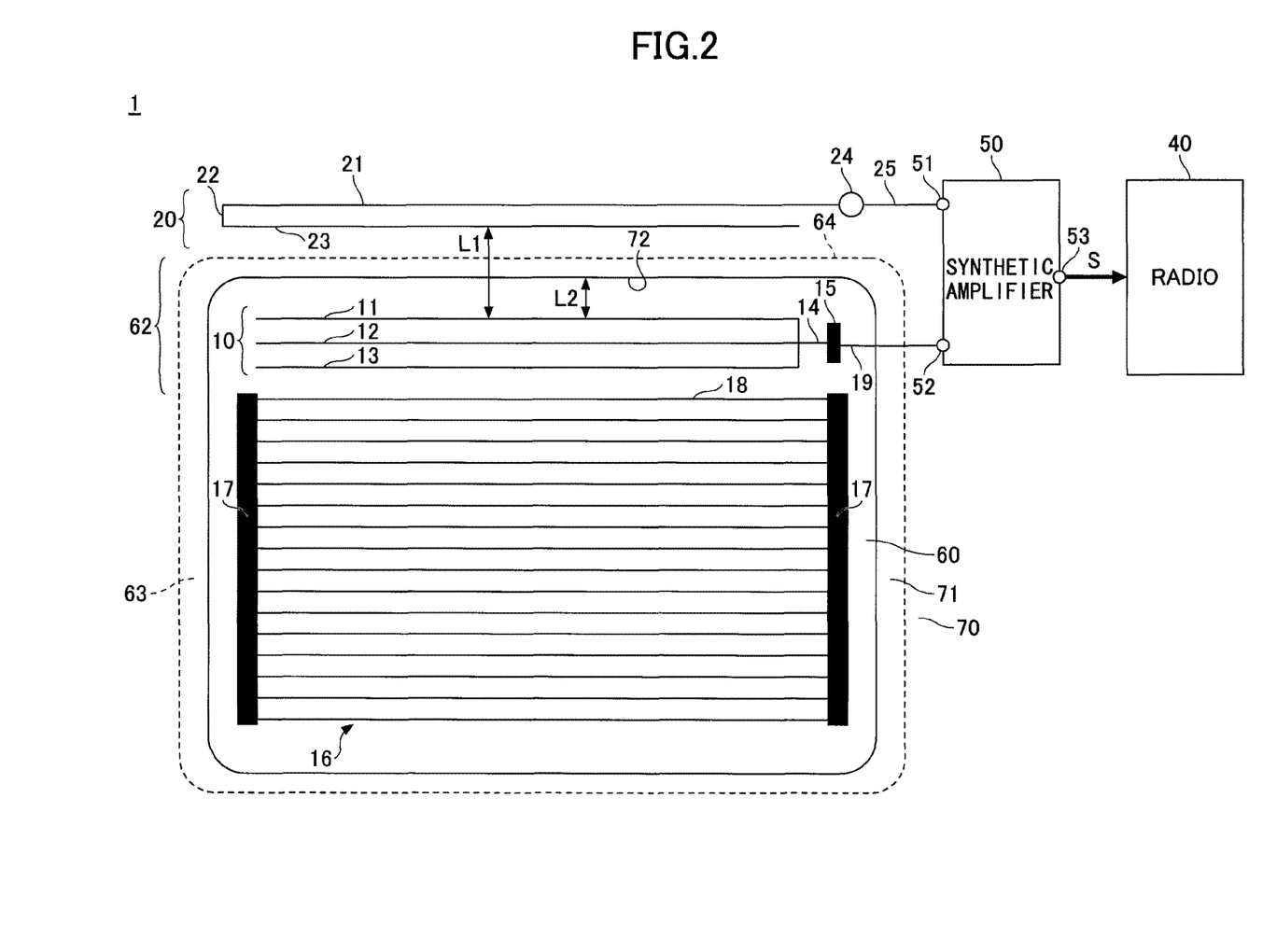
FIG. 2 is a diagram schematically showing an example of a configuration of an antenna system.

FIG. 2 is a diagram schematically showing an example of a configuration of an antenna system 1 according to the embodiment of the present invention, and FIG. 2 exemplifies a situation in which the window glass is the rear glass. Additionally, FIG. 2 exemplifies a situation in which the glass antenna is an AM glass antenna for receiving an AM broadcast wave. The antenna system 1 may include rear glass 60; the glass antenna 10; the in-vehicle antenna 20; a synthetic amplifier 50; and the radio 40.

The rear glass 60 is window glass that includes an outer circumferential part 63 that can be attached to a flange 71 that is formed in a metal body 70 of the vehicle. A periphery of the rear glass 60 is depicted by the dotted line. The flange 71 is a window frame that surrounds the window opening.

A defogger 16 including a plurality of parallel-running heater wires 18 and a plurality of belt-shaped bus bars 17 for supplying electricity to the heater wires 18 may be provided in the rear glass 60. The heater wires 18 and the bus bars 17 that can be included in the defogger 16 may be an electric heating type conductive pattern. FIG. 2 shows a situation in which the glass antenna 10 is provided in a margin region that is an upper side relative to the defogger 16 in the rear glass 60.

The glass antenna 10 may planarly be provided on the surface of the window glass. For example, the glass antenna 10 can be formed by printing a paste including an electrically conductive metal, such as a silver paste, on a surface of the window glass at the inner side of the vehicle, and baking it. However, a method is not limited to this formation method. A linear body or a foil shaped body that is formed of an electrically conductive material, such as copper, may be formed on the surface of the window glass at the inner side of the vehicle or on the surface of the window glass at the outer side of the vehicle, the linear body or the foil shaped body may be adhered to the window glass by an adhesive or the like, and/or the linear body or the foil shaped body may be provided in an inner part of the window glass. The same applies to the defogger 16 that is disposed on the window glass.

The glass antenna 10 is an antenna pattern that may include a feed unit 15 that is positioned at a right side of the window glass, and antenna conductors 11, 12, and 13 that are connected to the feed unit 15 via a connection conductor 14. The glass antenna 10 may be a conductor pattern that is formed so that a radio wave in an AM broadcast wave band can be received at a voltage that is greater than or equal to a predetermined received voltage. The glass antenna 10 can be exited in a state in which the radio wave in the AM broadcast wave band that comes from outside the vehicle is mixed with the noise in the same frequency band that is from inside the vehicle, and the glass antenna 10 can output, from the feed unit 15, the received signal that is greater than or equal to the predetermined received voltage.

The feed unit 15 is a feed point for connecting the antenna conductors 11, 12, and 13 to the synthetic amplifier 50. The feed unit 15 may preferably be an electrode installed in the rear glass 60 such that, upon the rear glass 60 being attached to the flange 71, the electrode is positioned in the vicinity of the flange 71. The connection conductor 14 may be a connecting element for connecting the feed unit 15 and the antenna conductors 11, 12, and 13. The antenna conductors 11, 12, and 13 are arranged so that they are parallel with each other, and the antenna conductors 11, 12, and 13 are linear elements that extend along an upper edge 64 of the rear glass 60.

The feed unit 15 can be electrically connected to a terminal 52 of the synthetic amplifier 50 via an electrically conductive member 19. As the electrically conductive member 19, a feeder line, such as an AV line and a coaxial line, may be used, for example. For a case of using the AV line, one end may be connected to the feed unit 15, and the other end may be connected to the terminal 52 of the synthetic amplifier 50. For a case of using the coaxial cable, an inner conductor of the coaxial cable may be electrically connected to the feed unit 15, and an outer conductor of the coaxial cable may be grounded to the metal body 70. Additionally, a connector for electrically connecting to the feed unit 15 may be installed in the feed unit 15. Such a connector may facilitate attachment of the AV line or the inner conductor of the coaxial cable to the feed unit 15. Furthermore, a configuration may be adopted such that a signal processing circuit, such as an amplifier, is implemented in the connector. Further, a configuration may be such that a protrusion-shaped electrically conductive member is installed in the feed unit 15, and the protrusion-shaped electrically conductive member may contact and fit a connecting portion that is provided in the flange to which the window glass is to be attached.

The shape of the feed unit 15 may be determined depending on a shape for implementing the above-described electrically conductive member or the connector. For example, a rectangular shape, such as a square shape, an approximately square shape, a rectangle shape, and an approximately rectangular shape, or a polygonal shape may be favorable for implementation. Note that the shape may be a circular shape, such as a circle, an approximate circle, an ellipse, and an approximate ellipse.

In addition, a glass antenna may be achieved by providing, in a synthetic resin film or on a surface of the synthetic resin film, a conductor layer that is formed of an antenna conductor, and by forming the synthetic resin film with the conductor layer on the surface of the window glass at the inner side of the vehicle or on the surface of the window glass at the outer side of the vehicle. Furthermore, a glass antenna may be achieved by forming, on the surface of the window glass at the inner side of the vehicle or on the surface of the window glass at the outer side of the vehicle, a flexible circuit board in which an antenna conductor is formed.

Further, a covering film may be formed on the surface of the window glass, and a part of or all the feed unit and the antenna conductor may be provided on the covering film. As the covering film, ceramics, such as a black ceramics film, can be considered. In this case, if the window glass is viewed from outside the vehicle, at least a part of the feed unit and the antenna conductor that are provided on the covering film may not be viewed from outside the vehicle because of the covering film, so that the window glass having a superior design can be achieved. By forming the feed unit and the part of the antenna conductor on the covering film (between the edge of the covering film and the edge of the window glass), only a narrow linear portion of the conductor can be viewed, if it is viewed from outside the vehicle, which may be preferable from the design perspective.

The in-vehicle antenna 20 is not disposed on the window glass on which the glass antenna 10 is disposed, and the in-vehicle antenna 20 is an antenna element that is disposed at an inner side of the vehicle compared to the metal body 70. The in-vehicle antenna 20 may be disposed, for example, in a space that is formed between a lining that covers the metal body 70 and the metal body 70. In this manner, a part of or all the in-vehicle antenna 20 can be hidden by the lining, so that the appearance can be enhanced.

In addition, if the in-vehicle antenna 20 is formed of an AV line, the in-vehicle antenna 20 can be easily wired at the inner side of the vehicle. However, the in-vehicle antenna 20 may be formed of another antenna conductor, instead of the AV line. For example, the in-vehicle antenna 20 may be formed of a conductor pattern that is formed on a substrate. Furthermore, an in-vehicle antenna may be achieved by providing, in a synthetic resin film or on a surface of the synthetic resin film, a conductive layer that is formed of an antenna conductor, and by forming the synthetic resin film with the conductor layer at an installation portion. In addition, an in-vehicle antenna may be formed of a metal tape. The in-vehicle antenna can be formed by sticking the metal tape that is formed to have a linear shape on the lining of the vehicle, for example.

The in-vehicle antenna 20 may include a feed unit 24 that is positioned at a right side of the vehicle, and antenna conductors 21, 22, and 23 that are connected to the feed unit 24, and the in-vehicle antenna may be a folded antenna that is formed so that a radio wave in an AM broadcast wave band can be received at a voltage that is greater than or equal to a predetermined received voltage. The in-vehicle antenna 20 may be excited by noise that only comes from inside the vehicle and that has a frequency that is the same as the AM broadcast wave band, and the in-vehicle antenna 20 may output, from the feed unit 24, a noise signal that is greater than or equal to the predetermined received voltage.

The feed unit 24 can be a feed point for connecting the antenna conductors 21, 22, and 23 to the synthetic amplifier 50. The in-vehicle antenna 20 may include the antenna conductor 21 that extends, from the feed unit 24 as a starting point, along the upper edge 64 of the rear glass 60, and the antenna conductor 23 that is folded at the antenna conductor 22 and that extends along the antenna conductor 21.

The feed unit 24 may be electrically connected to a terminal 51 of the synthetic amplifier 50 via an electrically conductive member 25. The electrically conductive member 25 may be configured to be the same as the electrically conductive member 19. The synthetic amplifier 50 may be positioned at a side of the vehicle that is the same as the side of the feed unit 15. Thus, the feed unit 24 may preferably be an electrode that is positioned at a side that is the same as that of the feed unit 15. In this manner, a length of the electrically conductive member 25 that is interposed between the synthetic amplifier 50 and the feed unit 24 can be reduced. Furthermore, the shape of the feed unit 24 can be any shape, and it is not particularly limited.

The synthetic amplifier 50 can be an example of a canceler for cancelling a noise signal of the in-vehicle antenna 20 in the received signal of the glass antenna 10. An example of a detailed configuration of the synthetic amplifier 50 is described below. The synthetic amplifier 50 may output, to the radio 40 via a terminal 53, a received signal that is obtained by removing the noise signal of the in-vehicle antenna 20 from the received signal of the glass antenna 10. Note that, even if there is a difference between a received voltage of the received signal and a noise voltage of the noise signal, a favorable noise cancelling condition can be achieved by adjusting respective voltages by adjusting gain of an AM amplifier.

The shortest distance L1 between the glass antenna 10 and the in-vehicle antenna 20 may preferably be less than or equal to 500 mm, and it may more preferably be less than or equal to 300 mm. By setting the shortest distance L1 to be such a length, the glass antenna 10 and the in-vehicle antenna 20 can receive the noise that comes from inside the vehicle at equivalent receiving environments. Consequently, the noise that is almost the same as the noise that is received by the glass antenna 10 can be received by the in-vehicle antenna 20, and the noise cancelling effect can be enhanced. For the case of FIG. 2, the shortest distance L1 may correspond to the shortest distance between the antenna conductor 11 at the uppermost stage of the glass antenna 10 and the antenna conductor 23 at the lowermost stage of the in-vehicle antenna 20.

The in-vehicle antenna 20 may preferably be disposed so that the longitudinal direction of the in-vehicle antenna 20 matches the longitudinal direction of the glass antenna 10. In this manner, similar to the above description, the noise cancelling effect can be enhanced because the receiving performance of the glass antenna 10 and the receiving performance of the in-vehicle antenna 20 can be made closer to each other, and the received levels of the noise can be made closer. For the case of FIG. 2, each of the longitudinal direction of the glass antenna 10 and the longitudinal direction of the in-vehicle antenna 20 can be a direction that is parallel to a road surface, and can be a direction that is perpendicular to a direction perpendicular to a plane of the rear glass 60.

The in-vehicle antenna 20 may preferably be formed so that the receiving performance of receiving a radio wave in the AM broadcast wave band of the in-vehicle antenna 20 is almost equal to that of the glass antenna 10. In this manner, the received voltage of the noise signal that is mixed in the received signal that is output from the feed unit 15 of the glass antenna 10 and the noise voltage of the noise signal that is output from the feed unit 24 of the in-vehicle antenna 20 can be approximated to be almost equal values. Consequently, during combining the received signal and the noise signal in the synthetic amplifier 50, an amount of adjusting the received voltage can be reduced to be the minimum or can be eliminated, so that the configuration of the canceler, such as the synthetic amplifier 50, can be simplified.

At least a part of the glass antenna 10 may preferably be positioned in the vicinity of an opening edge 72 of the window opening. The opening edge 72 is a flange end of the flange 71. By positioning in this manner, it becomes easier to dispose the in-vehicle antenna 20 to be closer to the glass antenna 10, compared to a case where the glass antenna 10 is positioned closer to the center of the rear glass 60 because, in the rear glass 60, a blank area between the glass antenna 10 and the opening edge 72 can be narrowed down. Additionally, an area that is occupied by the defogger 16 can be easily enlarged while ensuring the area that is occupied by the glass antenna 10. For example, the shortest distance L2 between at least a part of the glass antenna 10 and the opening edge 72 may preferably be less than or equal to 100 mm, and it may more preferably be less than or equal to 80 mm. For the case of FIG. 2, the shortest distance L2 corresponds to the shortest distance between the antenna conductor 11 at the uppermost stage of the glass antenna 10 and the opening edge 72.

The glass antenna 10 may preferably be disposed at an upper portion 62 of the rear glass 60. By doing this, the glass antenna 10 can be separated from the noise source in the vehicle as much as possible, while ensuring the receiving performance of the glass antenna 10 for receiving a radio wave that comes from outside the vehicle.

Figure 3:
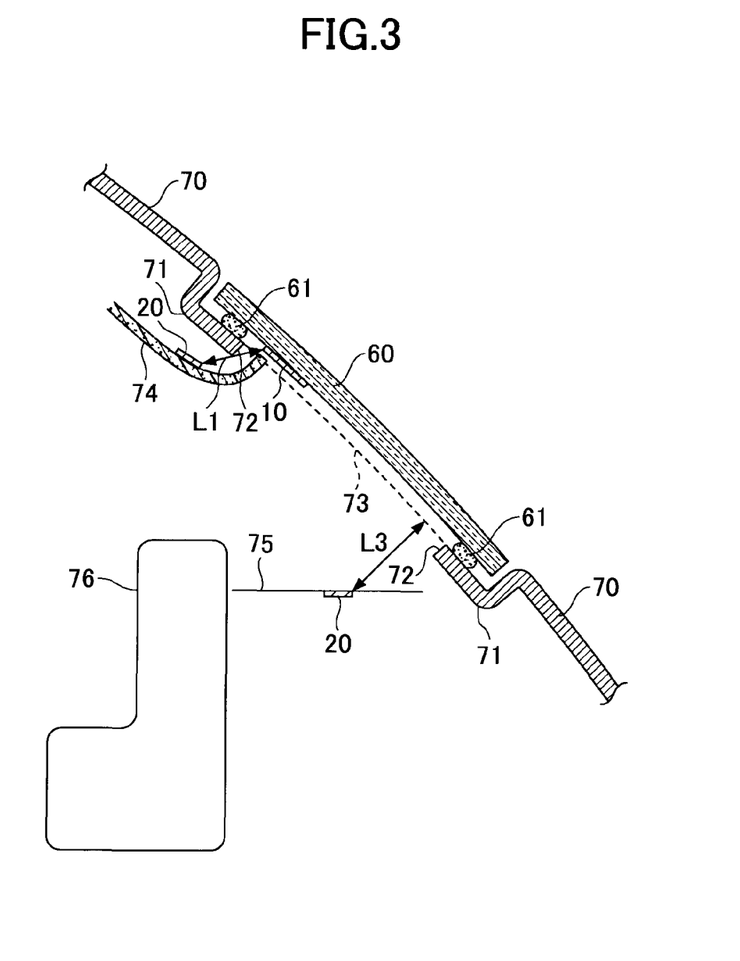
FIG. 3 is a cross-sectional view showing a state in which window glass is disposed in a window opening that is formed in a vehicle.

FIG. 3 is a cross-sectional view showing a situation in which the rear glass 60 is installed in the window opening 73. The flange 71 is provided in the metal body 70 of the vehicle so as to form the window opening 73. The rear glass 60 can be adhered to the flange 71 by an adhesive material 61, for example. The in-vehicle antenna 20 may be disposed at a position that is separated toward the inner side of the vehicle from a plane (which corresponds to the dashed line in FIG. 3) that is formed by the window opening 73. For example, if the shortest distance L3 between the in-vehicle antenna 20 and the plane that is formed by the window opening 73 is greater than or equal to 30 mm, which may preferably be greater than or equal to 50 mm, and which may more preferably be greater than or equal to 80 mm, the in-vehicle antenna 20 can be disposed at a position were a radio wave in the AM broadcast band that comes from outside the vehicle is sufficiently attenuated. Additionally, it can be disposed in a space between a trim 74 and the metal body 70. The trim 74 is a lining that covers the metal body 70 at the inner side of the vehicle. In this manner, for causing only the noise signal to be received by the in-vehicle antenna 20, it is preferable to install the in-vehicle antenna 20 in such a way that the metal body 70 is positioned in the incoming direction of the radio wave from outside the vehicle. Furthermore, it is also preferable in aesthetics because it is invisible from inside the vehicle. Additionally, the in-vehicle antenna 20 may be installed on an outer side or an inner side of a sun deck 75 that is provided at a rear portion of a rear seat 76.

Figure 4:
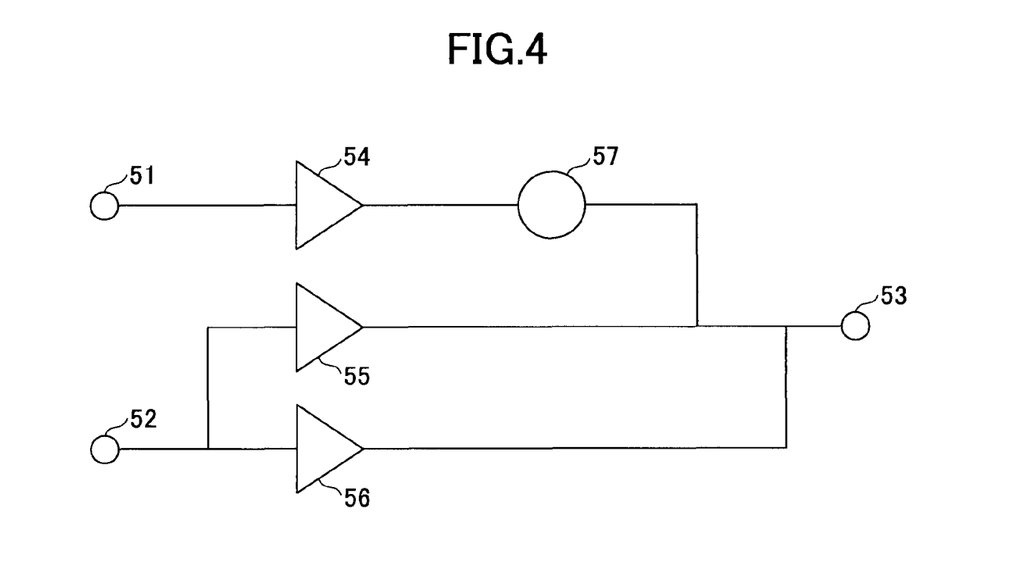
FIG. 4 is a diagram showing an example of a first configuration of a synthetic amplifier.

FIG. 4 is a diagram showing an example of a first configuration of the synthetic amplifier 50. The synthetic amplifier 50 in the figure may be a canceler including an AM amplifier 55, an AM amplifier 54, and a phase inverter 57, and the synthetic amplifier 50 can cancel a noise signal of the in-vehicle antenna 20 in the received signal of the glass antenna 10 by the phase inverter 57.

The AM amplifier 55 can amplify and output the received signal of the glass antenna 10 that is input from the terminal 52. The AM amplifier 54 can amplify and output the noise signal of the in-vehicle antenna 20 that is input from the terminal 51. The phase inverter 57 can output a signal that is obtained by inverting a phase of the output signal from the AM amplifier 54 by 180 degrees. The synthetic amplifier 50 can output, to the radio 40 from the terminal 53, a signal that is obtained by combining the output signal from the AM amplifier 55 and the output signal from the phase inverter 57.

Note that the synthetic amplifier 50 may include an FM amplifier 56. The FM amplifier 56 can amplify the received signal that is input from the terminal 52 and that is received by the glass antenna 10, and the FM amplifier 56 can output the amplified signal to the radio 40 from the terminal 53.

Figure 5:
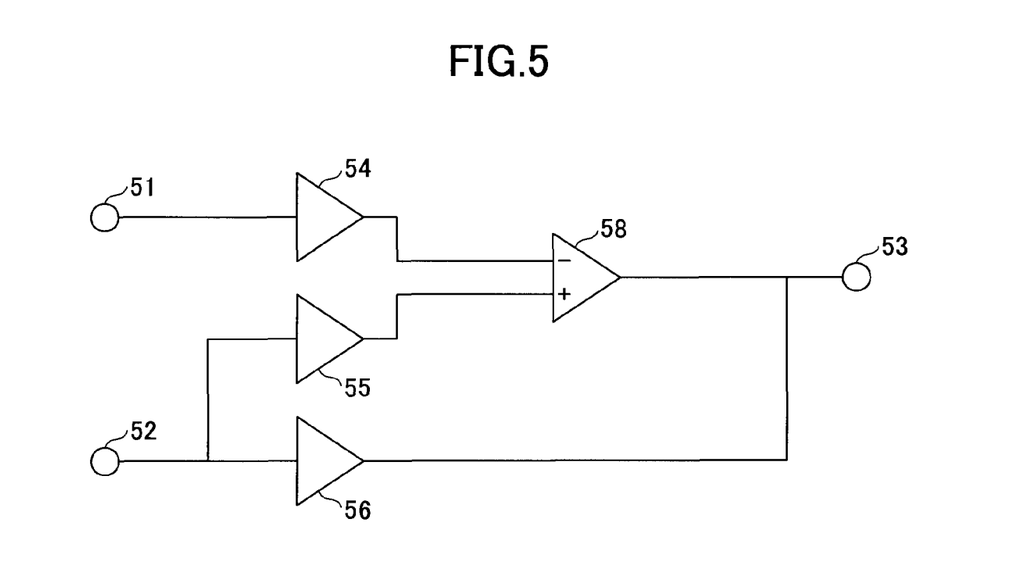
FIG. 5 is a diagram showing an example of a second configuration of the synthetic amplifier.

FIG. 5 is a diagram showing an example of a second configuration of the synthetic amplifier 50. Descriptions may be omitted for a configuration that is similar to the above-described configuration. The synthetic amplifier 50 in the figure may be a canceler including the AM amplifier 55, the AM amplifier 54, and a differential amplifier 58, and the synthetic amplifier 50 can cancel a noise signal of the in-vehicle antenna 20 in the received signal of the glass antenna 10 by the differential amplifier 58.

The differential amplifier 58 can amplify voltage difference between the output signal of the AM amplifier 55 and the output signal of the AM amplifier 54, and the differential amplifier 58 can output the amplified signal to the radio 40 from the terminal 53. The differential amplifier 58 can output, by its differential amplifying function, a signal from which the component of the noise signal of the in-vehicle antenna 20 is removed.

Figure 6:
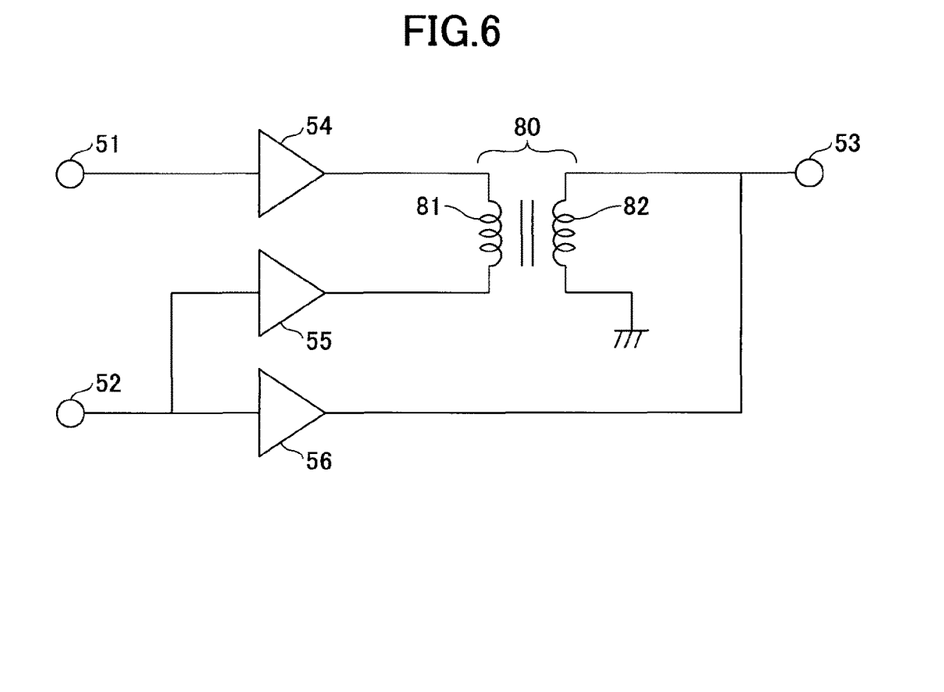
FIG. 6 is a diagram showing an example of a third configuration of the synthetic amplifier.

FIG. 6 is a diagram showing an example of a third configuration of the synthetic amplifier 50. Descriptions may be omitted for a configuration that is similar to the above-described configuration. The synthetic amplifier 50 in the figure may be a canceler including the AM amplifier 55, the AM amplifier 54, and a transformer 80, and the synthetic amplifier 50 can cancel a noise signal of the in-vehicle antenna 20 in the received signal of the glass antenna 10 with the transformer 80.

The transformer 80 is a voltage converter that includes a primary coil 81, and a secondary coil 82. The primary coil 81 may include one terminal that is to be connected to the feed unit 15 of the glass antenna 10 through the terminal 52 and the AM amplifier 55, and another terminal that is to be connected to the feed unit 24 of the in-vehicle antenna 20 through the terminal 51 and the AM amplifier 54. The secondary coil 82 may include one terminal that is to be connected to the radio 40 through the terminal 53, and another terminal that is to be grounded. The transformer 80 can output, from the secondary coil 82, the signal from which the component of the noise signal of the in-vehicle antenna 20 is removed, upon the received signal of the glass antenna 10 being input to the one terminal of the primary coil 81 and the noise signal of the in-vehicle antenna 20 being input to the other terminal of the primary coil 81.

Figure 7:
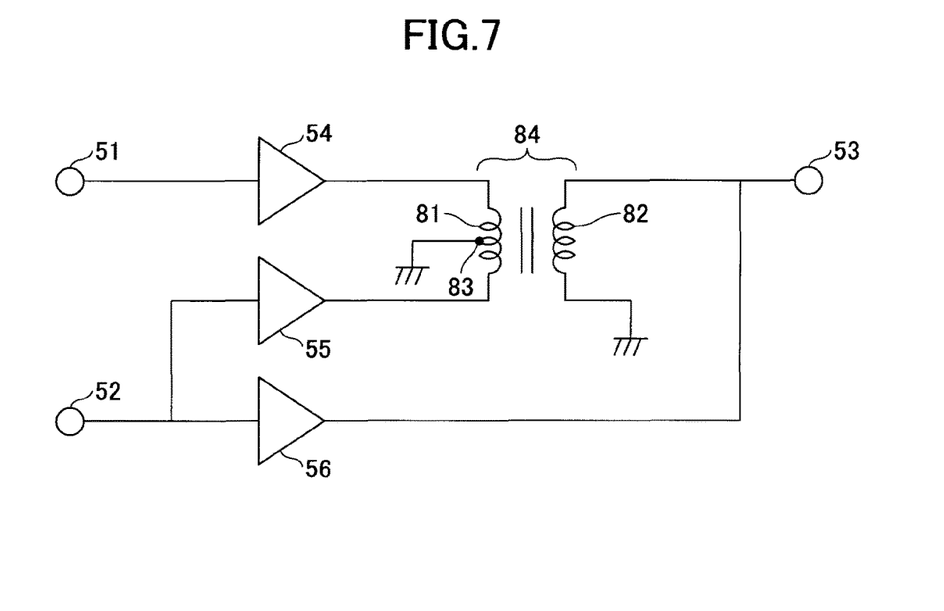
FIG. 7 is a diagram showing an example of a fourth configuration of the synthetic amplifier.

FIG. 7 is a diagram showing an example of a fourth configuration of the synthetic amplifier 50. Descriptions of a configuration that is similar to the above-described configuration may be omitted. The synthetic amplifier 50 in the figure may be a canceler including the AM amplifier 55, the AM amplifier 54, and a transformer 84, and the synthetic amplifier 50 can cancel a noise signal of the in-vehicle antenna 20 in the received signal of the glass antenna 10 by the transformer 84.

Similar to FIG. 6, the transformer 84 in FIG. 7 can output, from the secondary coil 82, the signal from which the component of the noise signal of the in-vehicle antenna 20 is removed. Additionally, the transformer 84 of FIG. 7 may include a center tap 83 that is to be connected to a middle part of the primary coil 81, and the center tap 83 may be grounded. In this manner, the transformer 84 in the figure can be used for balance-unbalance conversion, a balanced line can be connected to the terminal 53, and unbalanced lines can be connected to the terminals 51 and 52.

EXAMPLE

Figure 8:
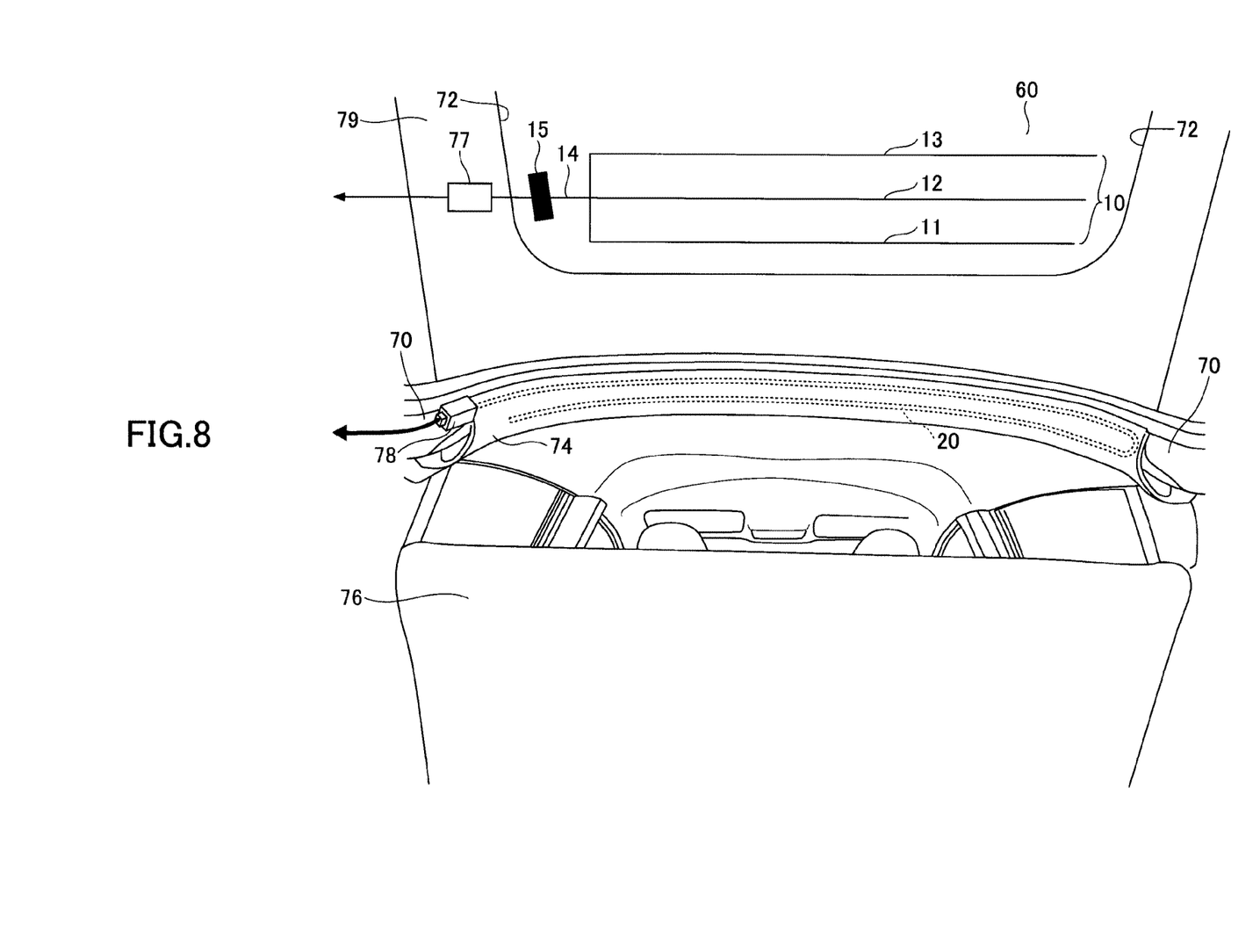
FIG. 8 is a diagram of the vehicle that is viewed from a rear side while a tail gate is opened upwardly.

Next, the results of a test by using an actual vehicle are described. FIG. 8 is a diagram of the vehicle that is viewed from a rear side while a tail gate 79 of the vehicle is opened upwardly. The tail gate 79 is a part of the metal body of the vehicle, and the tail gate 79 is an opening and closing door that is installed at a rear part of the vehicle. The rear glass 60 on which the glass antenna 10 is installed is installed in the tail gate 79.

The feed unit 15 of the glass antenna 10 is connected to a glass antenna amplifier 77, so that a received signal of the glass antenna 10 can be amplified and output. The feed unit of the in-vehicle antenna 20 is connected to an in-vehicle antenna amplifier 78, so that a noise signal of the in-vehicle antenna 20 can be amplified and output. The output signal of the in-vehicle antenna amplifier 78 is transmitted to a phase inverter, which is not shown in the figure, and a phase is inverted by 180 degrees. After that, the output signal of the glass antenna amplifier 77 and the phase-inverted output signal of the in-vehicle antenna amplifier 78 are combined. The in-vehicle antenna 20 is formed in a space between the trim 74 and the metal body 70. The in-vehicle antenna 20 is an AV line such that the AV line extends from the in-vehicle antenna amplifier 78 to a right side of the vehicle, and the AV line is folded and extends toward a left side of the vehicle. Note that, in this example, for convenience of the experiment, the AV line that is the in-vehicle antenna 20 is extended toward the right side in an inner part of the trim 74 (the space between the trim 74 and the metal body 70), and then the AV line is folded toward an outer side of the trim 74 and extended toward left side.

Furthermore, the sizes in the unit of mm of the components that are shown in FIG. 2 were set as follows:
the length of the antenna conductor 11: 820,
the length of the antenna conductor 12: 825,
the length of the antenna conductor 13: 830,
the shortest distance between the antenna conductor 11 and the antenna conductor 12: 30,
the shortest distance between the antenna conductor 12 and the antenna conductor 13: 30,
the shortest distance between the antenna conductor 13 and the heater wire 18: 40,
the shortest distance L1 between the glass antenna 10 and the in-vehicle antenna 20: 120,
the shortest distance L2 between the glass antenna 10 and the opening edge 72: 65,
the length of the antenna conductor 21: 900,
the length of the antenna conductor 22: 30, and
the length of the antenna conductor 23: 850.

Figure 9:
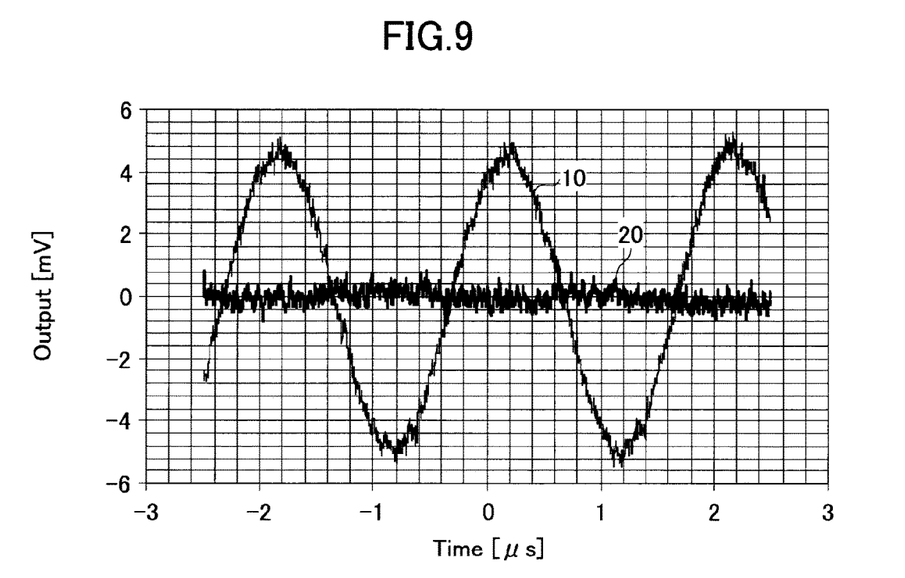
FIG. 9 is a diagram of received voltage waveforms, upon receiving a radio wave of 500 kHz that is coming from outside the vehicle.
Figure 10:
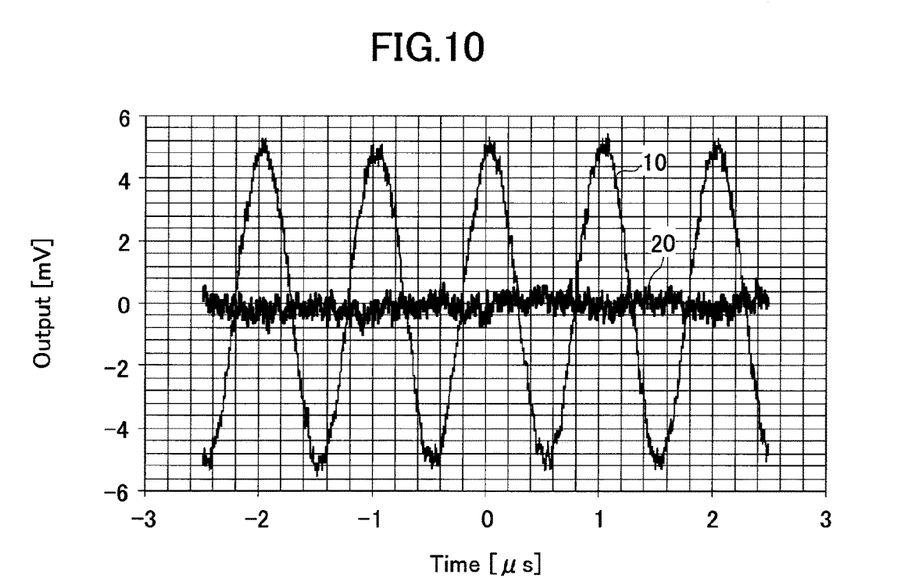
FIG. 10 is a diagram of received voltage waveforms, upon receiving a radio wave of 1000 kHz that is coming from outside the vehicle.
Figure 11:
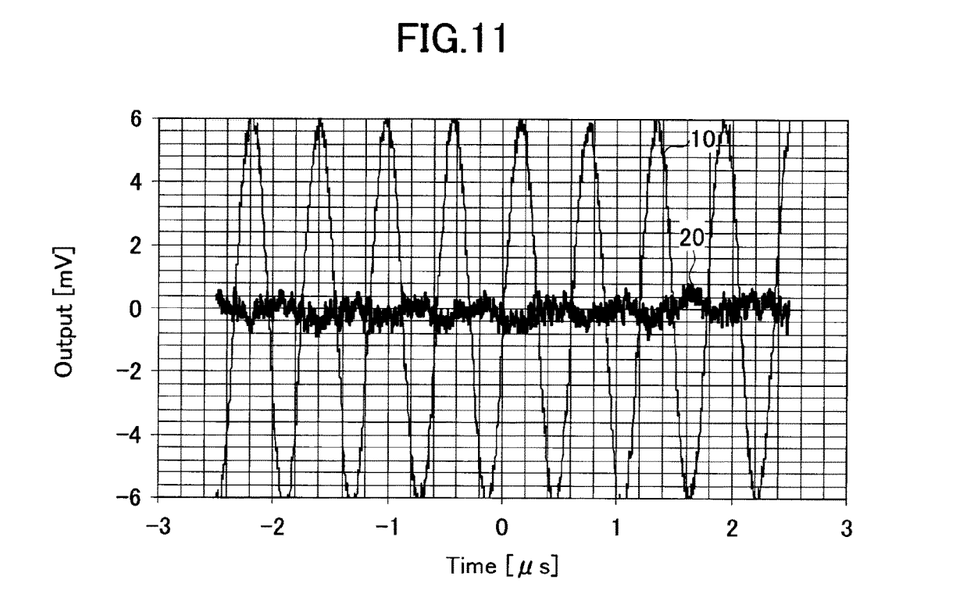
FIG. 11 is a diagram of received voltage waveforms, upon receiving a radio wave of 1700 kHz that is coming from outside the vehicle.

FIG. 9 shows received voltage waveforms of received signals that were obtained by respective antennas, upon receiving, by the glass antenna 10 and the in-vehicle antenna 20, a radio wave of 500 kHz that came from outside the vehicle. FIG. 10 shows received voltage waveforms of received signals that were obtained by respective antennas, upon receiving, by the glass antenna 10 and the in-vehicle antenna 20, a radio wave of 1000 kHz that came from outside the vehicle. FIG. 11 shows received voltage waveforms were obtained by respective antennas, upon receiving, by the glass antenna 10 and the in-vehicle antenna 20, a radio wave of 1700 kHz that came from outside the vehicle.

For any frequency in the corresponding figure, the glass antenna 10 could receive the radio wave in the AM broadcast wave band that came from outside the vehicle because the amplitude of the received voltage was large, whereas the in-vehicle antenna 20 could not receive the radio wave in the AM broadcast wave band that came from outside the vehicle because the amplitude of the received voltage was small.

Figure 12:
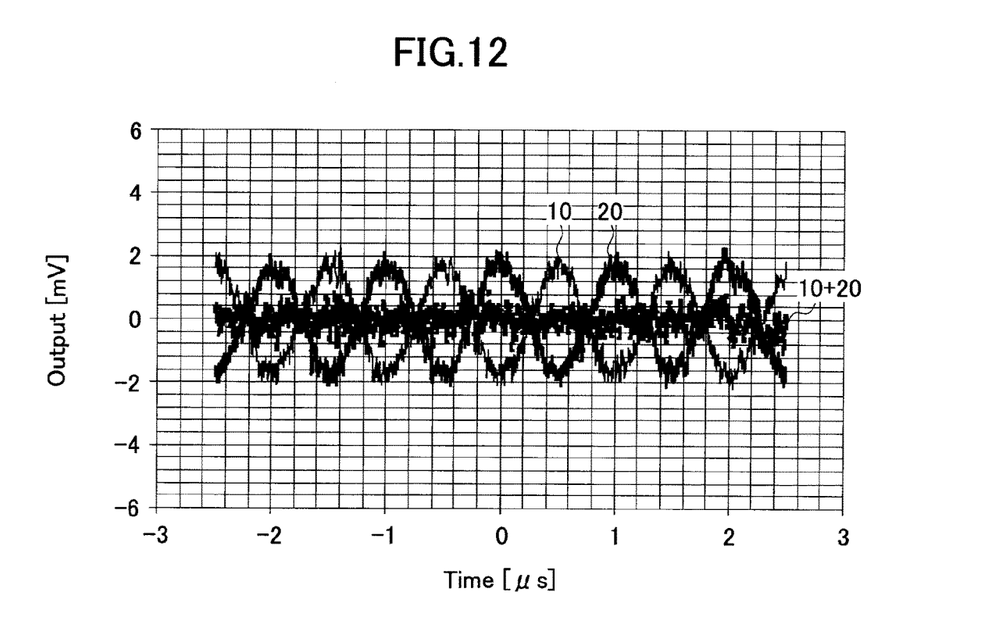
FIG. 12 is a diagram of received voltage waveforms, upon receiving noise of 1000 kHz that is coming from outside the vehicle.

FIG. 12 shows received voltage waveforms of received noise signals that were obtained by respective antennas, upon receiving, by the glass antenna 10 and the in-vehicle antenna 20, noise of 1000 kHz that came from a noise source inside the vehicle.

A pole antenna (specifically, a magnet base antenna) that was horizontally installed at a height of approximately 20 cm from a floor of the vehicle interior at a foot side of the rear seat and that was extended in the width direction of the vehicle was substituted for the noise source for emitting the noise of 1000 kHz that was to be mixed in the AM broadcast wave band.

In FIG. 12, the symbol "10" represents the noise voltage that was obtained by the glass antenna 10, the symbol "20" represents the noise voltage (the phase was inverted) that was obtained by the in-vehicle antenna 20, and the symbol 10+20 represents the noise voltage that was obtained by combining the noise voltages of the symbol 10 and the symbol 20. Note that the ground potential of the in-vehicle antenna 20 may be properly adjusted, so that the center of the amplitude waveform becomes 0 V, and the phase of the in-vehicle antenna 20 may be properly adjusted, so that it is in a state where the phase of the glass antenna 10 is inverted.

As shown in FIG. 12, the noise voltage can be reduced to be approximately zero V by inverting the received signal of the in-vehicle antenna 20 and combining it with the received signal of the glass antenna 10.

Figure 13:
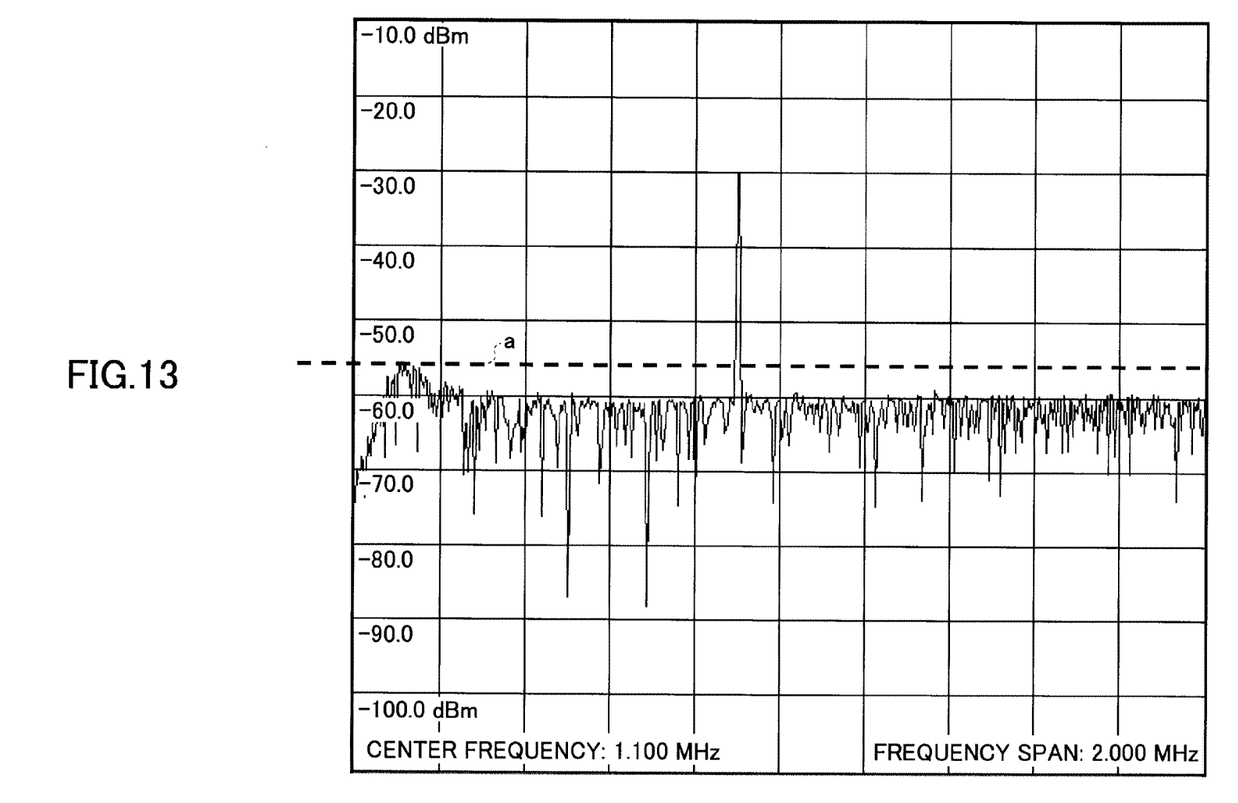
FIG. 13 is a diagram of a voltage level of a carrier wave and noise when a noise signal is not cancelled.
Figure 14:
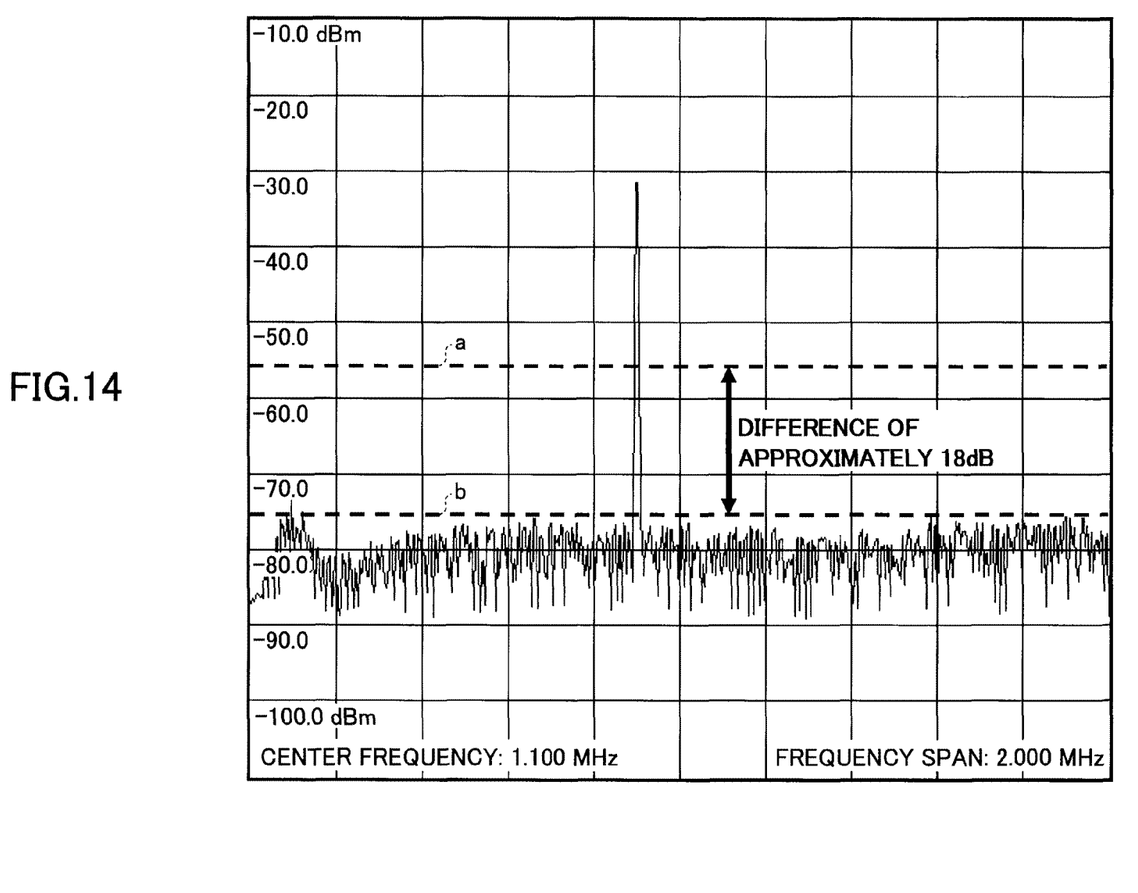
FIG. 14 is a diagram of the voltage level of the carrier wave and the noise when the noise signal is cancelled.

FIGS. 13 and 14 show voltage level of the carrier wave of the received signal and the noise that was obtained from respective antennas, upon receiving, by the glass antenna 10 and the in-vehicle 20, a radio wave of 1000 kHz that came from outside the vehicle. FIG. 13 shows the voltage level of the carrier wave and the noise for a case where the noise signal of the in-vehicle antenna 20 was not cancelled, and FIG. 14 shows the voltage level of the carrier wave and the noise for a case where the noise signal of the in-vehicle antenna 20 was cancelled by the synthetic amplifier 50.

Here, "a" indicates the maximum value of the noise for the case where the noise signal was not cancelled (FIG. 13), and "b" indicates the maximum value of the noise for the case where the noise signal was cancelled (FIG. 14). For the case of cancelling the noise signal (FIG. 14), the maximum value of the noise was improved by approximately 18 dB, compared to the case where the noise signal was not cancelled (FIG. 13).

The antenna system is described above by the embodiments. However, the present invention is not limited to the above-described embodiments. Various modifications and improvements, such as combining with, or substituting for a part of another embodiment or all the other embodiment, can be made within the scope of the present invention.

For example, the glass antenna and the in-vehicle antenna that can be used for the MF band or the LF band are not limited to the depicted configuration, and they can be configured in a different manner. Furthermore, the in-vehicle antenna may be disposed at an inner side of the vehicle relative to the lining that covers the metal body.

What is claimed is:

1. An antenna system comprising:
    a glass antenna disposed in window glass installed in a window opening that is formed in a metal body of a vehicle, wherein the glass antenna receives a mixed signal (S+N) comprising a radio wave in a MF band or in a LF band (S) and a noise signal generated inside the vehicle (N);
    an in-vehicle antenna disposed at an inner side of the vehicle compared to the metal body of the vehicle, wherein the in-vehicle antenna is positioned in a vicinity of the glass antenna and receives the noise signal (N); and
    a canceler to cancel the noise signal (N) received by the in-vehicle antenna in the mixed signal (S+N) received by the glass antenna.

2. The antenna system according to claim 1,
    wherein a shortest distance between the glass antenna and the in-vehicle antenna is less than or equal to 500 mm.

3. The antenna system according to claim 1,
    wherein the in-vehicle antenna is disposed so that a longitudinal direction of the in-vehicle antenna matches with that of the glass antenna.

4. The antenna system according to claim 1,
    wherein the in-vehicle antenna is formed so that receiving performance of the in-vehicle antenna to receive a radio wave in the MF band or in the LF band is approximately equivalent to that of the glass antenna.

5. The antenna system according to claim 1,
    wherein the in-vehicle antenna is disposed between a lining that covers the metal body and the metal body.

6. The antenna system according to claim 1,
    wherein the in-vehicle antenna is formed of an AV line.

7. The antenna system according to claim 1,
    wherein at least a part of the glass antenna is positioned in a vicinity of an opening edge of the window opening.

8. The antenna system according to claim 1,
    wherein a shortest distance between the glass antenna and an opening edge of the window opening is less than or equal to 100 mm.

9. The antenna system according to claim 1,
    wherein the glass antenna is disposed at an upper portion of the window glass.

10. The antenna system according to claim 1,
    wherein the glass antenna is an AM glass antenna and the radio wave (S) is an AM broadcast wave.

11. The antenna system according to claim 1,
    wherein the canceler comprises a phase inverter.

12. The antenna system according to claim 1,
    wherein the canceler comprises a differential amplifier.

13. The antenna system according to claim 1,
    wherein the canceler comprises a transformer.

* * * * *